United States Patent [19]

Gossen et al.

[11] Patent Number: 5,547,712
[45] Date of Patent: Aug. 20, 1996

[54] ANTISLIP PREPARATION

[75] Inventors: Ralf Gossen, Duisburg; Horst Buxhofer, Erkrath; Hermann Onusseit, Haan, all of Germany

[73] Assignee: Henkel Kommanditgesellschaft auf Aktien, Duesseldorf, Germany

[21] Appl. No.: 397,145

[22] PCT Filed: Sep. 6, 1993

[86] PCT No.: PCT/EP93/02405

§ 371 Date: Mar. 14, 1995

§ 102(e) Date: Mar. 14, 1995

[87] PCT Pub. No.: WO94/06880

PCT Pub. Date: Mar. 31, 1994

[30] Foreign Application Priority Data

Sep. 14, 1992 [DE] Germany .................. 42 30 473.3

[51] Int. Cl.⁶ .................................................. B05D 1/02
[52] U.S. Cl. ................ 427/421; 427/428; 427/429; 524/571; 524/577; 524/836; 525/78
[58] Field of Search ................ 525/78; 524/571, 524/577, 836; 427/421, 428, 429

[56] References Cited

U.S. PATENT DOCUMENTS

| 4,401,327 | 8/1983 | Caines | 428/395 |
| 4,953,717 | 9/1990 | Rosch | 211/113 |

FOREIGN PATENT DOCUMENTS

| 0156612 | 9/1982 | German Dem. Rep. . |
| 0234435 | 4/1986 | German Dem. Rep. . |
| 1262897 | 12/1965 | Germany . |
| 1943731 | 12/1970 | Germany . |
| 1917566 | 12/1970 | Germany . |
| 2031881 | 1/1972 | Germany . |
| 59-172569 | 9/1984 | Japan . |
| 62-110997 | 5/1987 | Japan . |

*Primary Examiner*—Melvyn I. Marquis
*Assistant Examiner*—D. Aylward
*Attorney, Agent, or Firm*—Ernest G. Szoke; Wayne C. Jaeschke; Real J. Grandmaison

[57] ABSTRACT

A process for producing an anti-slip article by preparing an aqueous dispersion containing a copolymer of styrene and a diene in a ratio by weight of from 20:80 to 80:20, and applying the aqueous dispersion onto a non-water-absorbing article.

22 Claims, No Drawings

ANTISLIP PREPARATION

BACKGROUND OF THE INVENTION

1. Field of the Invention

This invention relates to an antislip preparation based on an aqueous dispersion and to its use for non-absorbent articles.

2. Discussion of Related Art

The function of antislip preparations is to prevent the slipping, i.e. the unintentional sliding displacement, of two articles relative to one another, but at the same time to enable them to be readily separated from one another. This is generally achieved by the antislip preparation offering a high resistance to movements in the sliding direction, but little, if any, resistance to movements perpendicularly of the sliding direction so that the surfaces of the separated articles are not damaged. The raw materials for such antislip preparations are generally natural or synthetic macromolecular substances of the type also used for adhesives. In the same way as adhesives, antislip preparations can also be applied to an article to be secured from the melt in the absence of evaporating solvents or dispersants (see, for example, DE-A-19 17 566). This process requires special equipment for melting and applying the antislip preparation. It is more normal to apply the macromolecular substances in the form of a solution in organic solvents or in the form of an aqueous dispersion.

When the antislip preparations are used for water-absorbing articles, such as for example packs of cardboard, paperboard or paper, or in the coating of carpets, they are nowadays generally based on aqueous solutions or dispersions. Thus, DE-C-19 43 731 describes the use of aqueous solutions of the colloid xanthan gum as an adhesive for packaging materials. DE-C- 12 62 897 describes the use of aqueous dispersions of polymers of olefinically unsaturated compounds, more particularly polyvinyl acetate and copolymers thereof. According to DE-C-20 31 881, aqueous dispersions of paraffins and/or polyalkylenes may also be used. DD 156 612 describes a process for backing carpeting which provides the carpet with a firm, transparent, non-tacky and non-slip finish. To this end, a low-viscosity mixture with a solids content of 40 to 55% is prepared from a copolymer latex of butadiene with styrene and/or acrylonitrile and powder-form polyvinyl chloride, applied to the back of the carpet and subsequently dried. The addition of the polyvinyl chloride to the butadiene copolymer reduces its otherwise troublesome tackiness without adversely affecting the favorable antislip behavior on various types of flooring, such as wood, woodstone combinations and plastics. The coating mixture show very good adhesion to both natural and synthetic fibers.

Antislip preparations based on an organic solution of polymers or resins are generally used for non-water-absorbing articles. Thus, JP-A-59172569 describes solutions of ethylene/vinyl acetate copolymers and a hydrogenated glycidyl ester of colophony (Ester Gum H) in toluene for use in aerosol cans. Other conventional antislip preparations use chlorinated hydrocarbons, such as methylene chloride, as solvents for synthetic polymers, such as butadiene. However, solvents such as these should be avoided in the interests of industrial hygiene and ecology.

In addition, other requirements have to be satisfied according to the particular application. Thus, in most cases, there should be no reduction in the antislip effect on exposure to water, for example through redispersion of the antislip film. In many other cases,, bonding of the articles at elevated temperature is undesirable if it leads to destruction of the surface after separation of the articles. In other words, the resistance to movements perpendicularly of the surfaces of the articles should be as low as possible. By contrast, the antislip effect, i.e. resistance to movements parallel to the surfaces, should be as high as possible.

The problem addressed by the present invention was to provide an antislip preparation which would not have any of these disadvantages, i.e. would provide for problem-free application, even to non-water-absorbing articles, and would lead to a good temperature- and water-resistant antislip effect.

DESCRIPTION OF THE INVENTION

The solution provided by the invention is defined in the claims. It lies essentially in the choice of the polymer of styrene and a diene, such as isoprene or butadiene, as the basis for the antislip preparation. Accordingly, the antislip preparation according to the invention is based on an aqueous dispersion of 25 to 70% by weight and preferably 50 to 55% by weight of a preferably carboxyfunctional polymer of styrene and butadiene in a ratio by weight of 20:80 to 80:20 and, more particularly 35:65 to 65:35 and 0 to 20% by weight, preferably 0.05 to 10% by weight and, more preferably, 0.1 to 2.0% by weight of a viscosity regulator and 0 to 5% by weight and preferably 0.1 to 1.0% by weight of an antiager, the percentages by weight being based on the composition of the antislip preparation as a whole, i.e. including the residual water.

Accordingly, the basis for the antislip preparations according to the invention are copolymers of a diene, such as isoprene or butadiene, with styrene which best also contain approximately 0.5 to 5 mol-% and preferably 1 to 3 mol-% carboxyl groups in the molecule. Copolymers such as these may be prepared by polymerization in aqueous dispersion, an ethylenically unsaturated compound containing a lateral carboxyl group or a substituent thereof being used as the third comonomer. Examples of such carboxyfunctional comonomers are α, β-ethylenically unsaturated monocarboxylic and dicarboxylic acids and mixtures and salts thereof. Specific examples are acrylic acid, methacrylic acid, maleic acid, fumaric acid, itaconic acid and esters and salts thereof. However, the carboxyl groups may be incorporated not only during the polymerization of styrene and the diene, they may also be subsequently added, for example by grafting on or by a polymer-analog reaction, such as hydrolysis for example.

The viscosity of the antislip preparation should be such that it provides both for good application and for wetting. It is generally in the range from 6,000 to 9,000 mPa.s (Brookfield, spindle 4; 20 r.p.m.; 20° C.). The thickeners are anionic water-soluble macromolecular substances, such as for example carboxymethyl cellulose, polyacrylic acids and salts thereof, alginates, xanthan gum and, above all, copolymers of styrene and butadiene with a high carboxyl group content, more particularly higher than 5%.

Where the antislip preparation is used over prolonged periods, it is advisable to add an antiager, for example an alkylated bisphenol, in a concentration of 0 to 5% by weight and preferably in a concentration of 0.1 to 1.0% by weight.

The pH value of the antislip preparation is adjusted with alkali or ammonia to a value of 8 to 10 and preferably 8.5 to 9.5.

The antislip preparation preferably contains no other additives, particularly additives capable of penetration, such as plasticizers, polyvinylmethyl ether or emulsifiers.

The solids content of the antislip preparation is generally 40 to 60% by weight and, more particularly, 50 to 55% by weight. However, it may also be outside this range, for example if a longer evaporation time is acceptable for relatively low solids contents, the evaporation time decreasing with increasing solids contents.

The production of the antislip preparation from the individual components is simple and does not present the expert with any difficulties because it is carried out in the usual way by the usual means.

The antislip preparation is also applied to the articles by known methods, for example by roll coating, spray coating or brush coating.

The antislip preparations according to the invention are suitable both for the finishing of water-absorbing articles and, in particular, for the antislip finishing of non-water-absorbing articles of metals or plastics. In cases such as these, the water is preferably evaporated with warm air up to 140° C. A clear non-tacky film remains behind. This film is exceptionally water-resistant. To measure water resistance, a glass plate with a 40 micrometer thick film of the antislip preparation is stored in water for 3 hours at room temperature. Thereafter the film appears unchanged or, at most, is light grey but definitely not white.

Heat resistance up to temperatures of 85° C. is also exceptionally high. Thus, velvet-like textiles may be exposed on the pile side to a load of 400 g/20 cm$^2$ for 8 hours at 75° C. on a non-slip clothes hanger without any fluff from the pile being left behind on the clothes hanger after removal of the textile. There is also no sign of any change in the color or lustre of the velvet.

Despite this slight tendency to adhere, the antislip effect is particularly strong.

By virtue of these properties, the antislip preparation is particularly suitable for the non-slip finishing of clothes hangers, particularly clothes hangers of metal and plastics, for which polystyrene is best used.

In the special case of the non-slip finishing of clothes hangers, additional advantages are obtained in addition to the general positive effects, such as the absence of solvents, heat stability and water resistance:
the clothes hangers are completely recyclable because they consist mainly of styrene;
no penetration by low molecular weight additives and hence no adverse effect on the color and lustre of textiles.

The invention is illustrated by the following Example:

1. Production of the antislip preparation

1 Part by weight of anionic aqueous dispersion of an anionic copolymer of butadiene and styrene with a high content of carboxyl groups was added to a 40:60 copolymer of styrene and butadiene, which also contained itaconic acid as comonomer and was present in the form of a 53% aqueous dispersion having a pH value of 8.5, followed by stirring in standard machines until it had been homogeneously distributed (no streaks on application of a thin layer to a glass plate). 2 Parts by weight water were then added, followed by stirring to ensure homogeneous distribution. The viscosity was then 7,000 mPa.s (Brookfield, 20° C.). The pH value was 9.0 and the solids content 52% by weight.

2. Application

The antislip preparation was applied by a nozzle applicator both to the bar and to the two arms of a polystyrene clothes hanger in a quantity of approx. 3 g/hanger at room temperature and dried for about 5 minutes in air heated to 60°–80° C. A clear non-tacky film of the polymer of styrene and butadiene was formed.

3. Properties a) The antislip effect was determined by hanging trousers centrally on the clothes hanger and using a spring balance to determine the force under which they slipped for the first time. Evaluation has to take into account the various textiles used. Forces in the range from 2 to 8 kN were measured.

b) To determine heat resistance, velvet-like textiles were applied with the pile side to the hangers and exposed to temperatures of 70°, 75°, 80° and 85° C. for 8 hours under a load of 400 g/20 cm$^2$. The velvet was then removed from the clothes hanger. Evaluation was based on whether or not fluff remained on the clothes hanger. In the case of the antislip preparations according to the invention, no fluff adhered to the clothes hangers at 80° C. and, in some cases, even at 85° C.

c) Water resistance was determined by forming a 40 micrometer thick film of the antislip preparation on a glass plate and drying the film for 24 hours at room temperature. The sample thus produced was stored in water at 20° C. for 3 hours. Water resistance was then evaluated according to whether the films had remained transparent or whether they had turned slightly grey, grey or even white. The antislip preparation according to the invention was light grey.

We claim:

1. A process for producing an anti-slip clothes hanger comprising:
   (a) forming an aqueous dispersion containing a copolymer of styrene and a diene in a ratio by weight of from 20:80 to 80:20; and
   (b) applying said aqueous dispersion onto said clothes hanger.

2. The process of claim 1 wherein said aqueous dispersion contains from 25 to 70% by weight of said copolymer, based on the weight of said aqueous dispersion.

3. The process of claim 2 wherein said aqueous dispersion contains up to 20% by weight of a viscosity regulator, based on the weight of said aqueous dispersion.

4. The process of claim 3 wherein said aqueous dispersion contains from 0.1 to 2.0% by weight of said viscosity regulator, based on the weight of said aqueous dispersion.

5. The process of claim 2 wherein said aqueous dispersion contains up to 5% by weight of an anti-aging agent, based on the weight of said aqueous dispersion.

6. The process of claim 5 wherein said aqueous dispersion contains from 0.1 to 1% by weight of said anti-aging agent, based on the weight of said aqueous dispersion.

7. The process of claim 1 wherein said copolymer contains from about 0.5 to about 5 mol-% carboxyl groups in the molecule.

8. The process of claim 1 wherein said aqueous dispersion has a Brookfield viscosity of from 6,000 to 9,000 mPa:s.

9. The process of claim 1 wherein said aqueous dispersion has a pH value of from 8.5 to 9.5.

10. The process of claim 1 wherein said aqueous dispersion has a solids content of from 40 to 60% by weight, based on the weight of said aqueous dispersion.

11. The process of claim 2 wherein said aqueous dispersion contains from 50 to 55% by weight of said copolymer, based on the weight of said aqueous dispersion.

12. The process of claim 1 wherein said aqueous dispersion is free of additives selected from the group consisting of plasticizers, polyvinylmethyl ether and emulsifiers.

13. The process of claim 1 wherein roll-coating is used to apply said aqueous dispersion onto said clothes hanger.

14. The process of claim 1 wherein spray-coating is used to apply said aqueous dispersion onto said clothes hanger, 15. The process of claim 1 wherein brush-coating is used to apply said aqueous dispersion onto said clothes hanger.

16. The process of claim 1 wherein said clothes hanger is a metal hanger.

17. The process of claim 1 wherein said clothes hanger is a plastic hanger.

18. The process of claim 17 wherein said plastic hanger is made of polystyrene.

19. The process of claim 1 wherein said diene is selected from isoprene and butadiene.

20. The process of claim 1 wherein said copolymer comprises a carboxy functional polymer of styrene and butadiene.

21. The process of claim 20 wherein said carboxy functional polymer contains a comonomer selected from the group consisting of α, β-ethylenically unsaturated monocarboxylic acids, dicarboxylic acids, and mixtures thereof.

22. The process of claim 21 wherein said comonomer comprises itaconic acid.

* * * * *